United States Patent
Husain et al.

(10) Patent No.: US 6,978,380 B1
(45) Date of Patent: Dec. 20, 2005

(54) SYSTEM AND METHOD FOR SECURE AUTHENTICATION OF A SUBSCRIBER OF NETWORK SERVICES

(75) Inventors: Mohammad Husain, Humble, TX (US); Manish Desai, Houston, TX (US)

(73) Assignee: Commerciant, L.P., Houston, TX (US)

( * ) Notice: Subject to any disclaimer, the term of this patent is extended or adjusted under 35 U.S.C. 154(b) by 928 days.

(21) Appl. No.: 09/588,453

(22) Filed: Jun. 6, 2000

(51) Int. Cl.[7] .................. A04L 9/0032; G06F 11/30; G06F 12/14; G06F 17/60
(52) U.S. Cl. .................. 713/200; 713/155; 705/18; 705/21; 705/43
(58) Field of Search .................. 705/43, 18, 21; 713/200, 155

(56) References Cited

U.S. PATENT DOCUMENTS

| | | | |
|---|---|---|---|
| 5,721,781 A | * | 2/1998 | Deo et al. .................. 705/67 |
| 6,016,476 A | * | 1/2000 | Maes et al. .................. 705/1 |
| 6,233,577 B1 | * | 5/2001 | Ramasubramani et al. .... 707/9 |

FOREIGN PATENT DOCUMENTS

| | | |
|---|---|---|
| EP | 0 855 687 A2 | 7/1998 |
| WO | WO 99/07121 A2 | 2/1999 |
| WO | WO 00/75749 A2 | 12/2000 |

OTHER PUBLICATIONS

PCT Search Report in International Application No. PCT/US01/40855, Feb. 11, 2003.

* cited by examiner

*Primary Examiner*—Gilberto Barron
*Assistant Examiner*—Banjamin E. Lanier
(74) *Attorney, Agent, or Firm*—Fulbright & Jaworski LLP

(57) ABSTRACT

A system and method for electronically authenticating a subscriber account for a network service is disclosed. In the preferred embodiment, a subscriber account provider receives initial information from a subscriber. The received information is stored by the subscriber account provider. A transaction processing device is provided to the subscriber and the subscriber is electronically authenticated prior to enabling the subscriber account for performing the network service. In the preferred embodiment, the step of electronically authenticating the subscriber comprises receiving captured information from subscriber through said transaction processing device. After receiving the captured information the subscriber account provider utilizes the captured information to receive verifying information about the subscriber; and then compares the verifying information with the initial information to authenticate the subscriber.

50 Claims, 2 Drawing Sheets

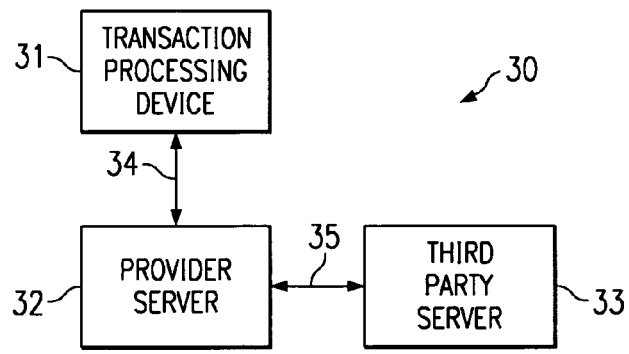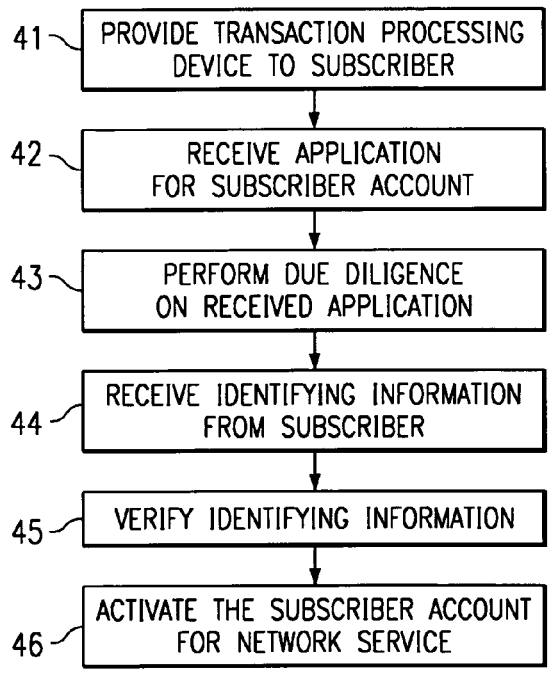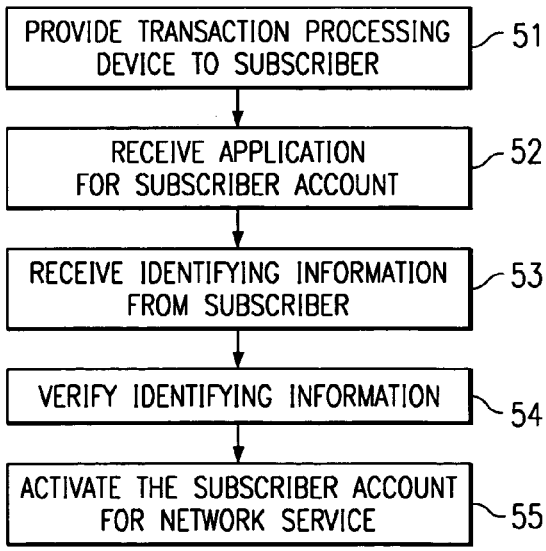

SYSTEM AND METHOD FOR SECURE AUTHENTICATION OF A SUBSCRIBER OF NETWORK SERVICES

RELATED APPLICATIONS

The present application is related to concurrently filed, commonly assigned and copending U.S. patent application, entitled "A System and Method for Secure Provisioning and Configuration Of A Transaction Processing Device", the disclosure of which application is incorporated herein by reference.

TECHNICAL FIELD

The present invention relates generally to a system and method for secure setup and management of transaction processing devices and in particular to a system and method for secure electronic authentication of a subscriber account for a network service, such as a payments processing service.

BACKGROUND

Existing credit and debit card processing systems utilize a card processing terminal, typically associated with a host computer, which is connected to a private network for credit and/or debit card processing. A consumer desiring to make payments for goods or services purchased at a merchant location would typically present his/her credit or debit card to a representative of the merchant at the check out counter. The representative at the check out counter would swipe the card across a card reader which is typically attached to or part of the card processing terminal. Once the card is swiped, information associated with the transaction is transmitted via a private network maintained by private network operators, such as First Data Corp., to a server associated with the private network. The private network server in turn sends information associated with the transaction to a server associated with the bank issuing the card and the bank which processes the electronic authorization of the payments for the merchant (the payment processor), again through a private network maintained by the private network operator. The payment processor then sends back authorization for charging the card to the server maintained by the private network operator, which in turn sends the authorization to the merchant location.

Typically a payment processor, such as a bank or other payment acceptance provider, in order to allow a subscriber, such as a merchant, to open an account such as a merchant account with the payment processor so that the merchant may provide a network service, such as a payment processing service, to its customer would collect an application from the merchant. The application is typically received by the payment processor by fax, regular mail, via an interview between a representative of the payments processor and the subscriber, or via a web page on the internet.

Once information about the subscriber is collected, the payment processor performs due diligence on the information. The information collected is used to verify the validity, the legitimacy and/or the worthiness of the business, the subscriber applying for the account on behalf of the business and/or the personal guarantor of the subscriber. Such information may include personal, credit and/or historical information of the subscriber and/or personal guarantor, credit and/or historical information about the business entity, financial history and tax information, business location and site information, marketing methods, products and services descriptions, means of delivery of the products/services, point-of-transaction information, projected processing volumes and/or the like.

The authentication of the signor of the application or the subscriber is typically performed by physical verification where the signor of the application presents or supplies identifying information to a representative of the payment processor. The identifying information may also be provided directly to the payment processor where the subscriber photocopies an identification card, such as a driver's license or a birth certificate and provides it to the payment processor for identification. However, for applications received over the internet, there is no direct authentication of the subscriber. The site location of the merchant is typically authenticated by using third party site assessment companies visit the physical site of the business and taking pictures.

Once the legitimacy of the business entity is verified and the business or personal guarantor's credit is cleared for providing the business with a subscriber account, a transaction processing device, such as a point-of-sale electronic terminal is distributed to the subscriber. The subscriber may also have older terminals and/or software. In any case, the terminals used by the subscribers are programmed for servicing the new payments processing service. Programming of the terminals is desirable to provide receipt related data to the terminal. Such data may include subscriber identifying information, such as name of the merchant, address of the merchant, phone number of the merchant, logo of the merchant, and/or the like.

The process for distributing and/or programming the terminals is currently performed in one of the following three methods. In the first method, the terminal may be programmed at the location of the payment processor or at the location of a third party authorized by the payment processor. Once the terminal is programmed, the preprogramed terminal is distributed to the merchant through regular mail.

In the second method, the terminal is distributed to a field representative or a contracted representative of the payment processor. The representative of the payment processor delivers the terminal to the merchant and the terminal is programmed at the business location of the merchant by the representative of the payment processor.

In the third method, the terminal is distributed to the merchant by regular mail. The received terminal may then be remotely configured via private communication lines. Typically during the configuration, the merchant is guided through the setup process by a representative of the payment processor. Some portion of the configuration information may be remotely downloaded. Because the terminal is configured via private communication lines there is no need to provide any extra security to the information transmitted or received.

Existing systems for receiving an application for a subscriber account, performing due diligence on the application, programming and/or distributing a terminal to the merchants have several drawbacks. Such systems do not provide electronic means for verifying the identity of the individual from whom the information was actually collected. For example, when a merchant applies for a merchant account over the internet, the authentication of the person applying over the internet cannot be performed electronically. Moreover, existing systems and methods are not capable of electronically verifying that the person using the terminal is an authorized user of the terminal.

Additionally, each of the processes for distributing and/or programming the terminals described above has drawbacks. For example, each of the methods described above requires a representative of the payment processor to provide instructions to and authenticate the subscriber applying for the subscriber account and/or to program the terminal. This adds to the cost of the payment processor to provide a subscriber account to the subscriber.

Moreover, once the terminal is mailed to the subscriber, there is no way of verifying that an authorized individual is actually using or setting up the terminal at the merchant location for a legitimate business purpose. Thus, there is no way to verify that an unauthorized individual or business is not currently using the terminal and the merchant account. This causes problems especially in a payment processing system where the individual using the terminal and/or merchant account acquires access to credit card numbers of consumers by virtue of possessing the terminal. Thus, an unauthorized user of the terminal could get funds deposited to his/her bank account even though he has provided no goods or services. For example, a person with malicious intent could access the web page of the payment processor in order to apply for a merchant account. The person could provide stolen identifying information, such as someone else's name and business information to the payment processor. The only information provided to the payment processor that would correspond with information of the unauthorized person would be his/her banking information.

Upon receiving the information, the payment processor would perform physical due diligence on the business and the principal of the business. Because the due diligence is performed on an existing individual with a viable business, the due diligence would not alert the payment processor as to any discrepancy in the provided information. Thus, the payment processor could preprogram the terminal and provide it to the address provided for delivery. Or, the payment processor could inadvertently help the unauthorized user set up an existing terminal to access the processing service. In any case, once the unauthorized individual receives the terminal or reconfigures an existing terminal he/she could start processing credit cards without the payment processor being aware for a period of time that the terminal is under the control of an unauthorized individual.

Therefore, there is a need in the art for a system and method for secure electronic authentication of a subscriber, such as a merchant requesting a subscriber account to provide services over a private network or a public network, such as the internet.

SUMMARY OF THE INVENTION

These and other objects, features and technical advantages are achieved by a system and method for electronically authenticating a subscriber requesting a subscriber account for providing a network service.

In the preferred embodiment, a subscriber account provider receives initial information from a subscriber. The received information is stored by the subscriber account provider. A transaction processing device is provided to the subscriber and the subscriber is electronically authenticated prior to enabling the subscriber account for performing the network service. In the preferred embodiment, the step of electronically authenticating the subscriber comprises receiving captured information from subscriber through said transaction processing device. After receiving the captured information the subscriber account provider utilizes the captured information to receive verifying information about the subscriber; and then compares the verifying information with the initial information to authenticate the subscriber.

In an alternative embodiment, a transaction processing device is provided to said subscriber. The subscriber utilizes the transaction processing device to provide initial information to a provider of the subscriber account. The provider of the subscriber account stores the received information in a database. The subscriber then provides additional information to the provider of the subscriber account through the transaction processing device. The provider then utilizes the additional information to receive verifying information about the subscriber. The verifying information is then compared to the initial information provided by the subscriber in order to authenticate the subscriber. The subscriber account is activated upon completion of the authentication of the subscriber.

According it is a technical advantage of a preferred embodiment of the present invention that a user of a transaction processing device can be electronically authenticated.

It is another technical advantage of a preferred embodiment of the present invention to provide independent verification of information provided by a subscriber.

It is yet another technical advantage of a preferred embodiment of the present invention to provide a retail channel of distribution for point-of-sale terminals.

It is still another technical advantage of a preferred embodiment of the present invention that a point-of-sale terminal can be verified.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, and the advantages thereof, reference is now made to the following descriptions taken in conjunction with the accompanying drawing, in which:

FIG. 3 shows a schematic of a preferred embodiment network for activating the subscriber account;

FIG. 4 shows a flowchart for activating the subscriber account in an alternative embodiment; and FIG. 5 shows a flowchart for activating the subscriber account in another alternative embodiment.

DETAILED DESCRIPTION

Figure 1:
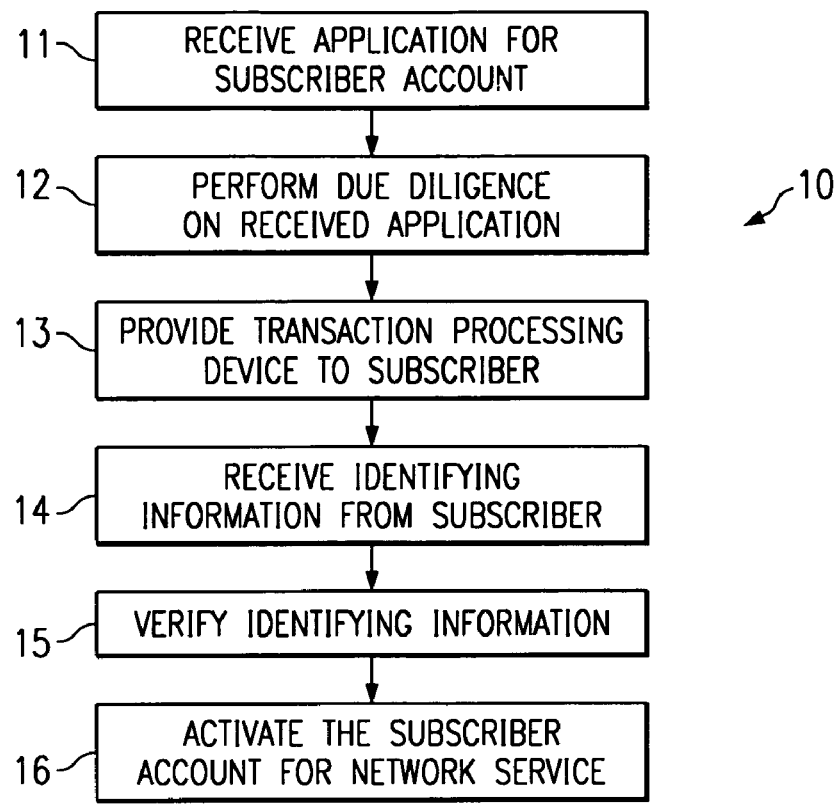
FIG. 1 shows a preferred embodiment flowchart for activating a subscriber account.

FIG. 1 shows a preferred embodiment flowchart 10 for activating a subscriber account for an individual or entity, such as a small office/home office (SOHO) type business, a large business or other provider of goods and/or services, desiring to provide a network service, such as a payment processing service, to its customer. The payment processing service provided may be for example, credit card processing, debit card processing, check verification, check guarantee, payroll processing, gift certificate issuance, issuance of electronic tickets, issuance of money order and/or other like services.

In the preferred embodiment, in step 11, the subscriber applies for a subscriber account with a provider of a subscriber account, such as a payment processor, for example a bank or other payment acceptance provider. The application preferably includes information about the individual applying for the subscriber account, information about the business entity, if any, on behalf of whom the application is being made, information about other individuals authorized to act on behalf of the business entity or the individual and/or the like. Such information may include for example, contact information about the authorized individuals and/or the business entity, if any, such as phone numbers, fax numbers, electronic addresses, for example email address, credit, tax and/or historical information about the business entity, financial history and/or tax information about the principal of the business, information about location of the business, marketing methods, products and/or services descriptions, means for delivering the products/services, projected processing volumes, and/or the like.

The application may be provided to the payment processor by any means. In the preferred embodiment, the subscriber accesses the payment processor's web site and applies for the subscriber account via the internet. The web site may be accessed by using a conventional processor based system such as a personal computer, or a wireless device, such as a cellular phone, a personal digital assistant, a palm pilot and/or the like. If desired, the subscriber may access the web site through a stand alone internet enabled device.

In alternative embodiments, the subscriber may apply for the account over the phone by talking to a representative of the payment processor, by responding to predetermined queries, and/or by interacting with an interactive voice recognition unit. The subscriber may also provide the desired information to the payment processor by talking to a representative of the payment processor in person, or by filling out an application form and sending it to the payment processor.

Upon receiving the application, in step 12 the payment processor performs due diligence on the received application. The physical location of the business is verified preferably by using third party site assessment companies visit the physical site of the business and taking pictures. Additionally or in the alternative, the location of the business may be verified by receiving and verifying the location lease information, the tax records of the business, the mortgage information, and/or the like.

Once the legitimacy of the business entity is verified and the business or personal guarantor's credit is cleared for providing the business with a subscriber account, in step 13 a transaction processing device, such as a point-of-sale electronic terminal, and/or associated software, is provided to the subscriber. The transaction processing device of the preferred embodiment is an internet enabled device as shown and described in the above referenced U.S. patent application entitled "A Standalone Internet Enabled Transaction Processing Device", the disclosure of which is incorporated herein by reference.

Figure 2:
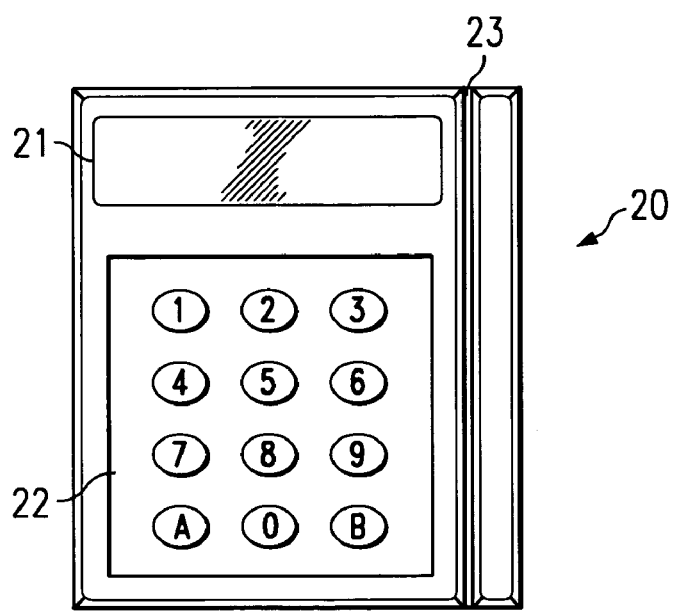
FIG. 2 shows a pictorial representation of a transaction processing device of the preferred embodiment.

FIG. 2 shows a pictorial representation of a transaction processing device 20 of the preferred embodiment. As shown in FIG. 2, transaction processing device 20 includes a display screen 21, keypad 22 and card reader 23. The display screen may be an LCD display, a touch screen, or the like. Display 21 may be used for various purposes, such as prompting a subscriber to enter information, displaying instruction for performing various activities, displaying the progress of a transaction, asking challenge questions and/or other information. This is especially useful when a subscriber is applying for a subscriber account to provide a network service and/or activating the subscriber account. The information displayed on the display screen may be interactive. For example, by using keypad 22 and/or the display screen 21, the subscriber can respond to specific queries in order to authenticate itself. Thus, the subscriber can be electronically authenticated to ensure that the person activating the subscriber account is authorized to activate the account.

The transaction processing device may be provided to the subscriber by mail. Thus, the payment processor may mail the transaction processing device to the subscriber preferably at the address provided by the subscriber at the time for applying for the subscriber account. In an alternative embodiment the transaction processing device may be provided to a representative of the payment processor who may then deliver the device to the subscriber. Furthermore, if desired, the transaction processing device may be available to be purchased at retail locations. Thus, upon completion of due diligence on the application by the payment processor, the subscriber may be instructed to purchase the transaction processing device from any of the retail locations. In the preferred embodiments the transaction processing device is not enabled for immediate use when provided to the subscriber.

Moreover, upon the completion of due diligence, an identifying token, such as a username and a password, may also be provided to the subscriber either electronically or physically. The identifying token is preferably provided to the subscriber separate from the transaction processing device to provide added security. For example, where the subscriber has provided an email address, the user name and password may be provided to the subscriber via email or the identifying token may be provided to the subscriber over the phone or through the mail. In cases, where both the transaction processing device and the identifying token are mailed to the subscriber, it is preferable to provide these via separate communications in order to provide an added layer of security. If both the transaction processing device and the identifying token are provided to the subscriber by the same communication and the communication falls into the hands of an unauthorized individual, the received device and identifying token may be misused by the unauthorized individual as the unauthorized individual would have both the device and the identifying token.

If desired, the identifying token may be provided to the subscriber at the time of applying for the account. This is especially useful in situations where the subscriber applies for the account over the internet at the web site of the payment processor. Thus, the subscriber may select its own user name and password at the time of applying for the account, if desired. In the alternative, the identifying token may be generated by the payment processor.

The subscriber may additionally or alternatively be provided with a physical device with the identifying information encoded in at least a portion of the device. Such a device may be a card, such as a card with a magnetic stripe or a bar code, a chip, such as a nano chip embedded in a card or other electronic device.

Upon receiving the electronic terminal and/or the associated software, the subscriber would preferably authenticate itself to the payment processor prior to activation of the subscriber account for providing a network service. This is because it is desirable to ensure that the person utilizing the transaction processing device is an authorized individual as specified in the application for the subscriber account.

In the preferred embodiment, the authentication of the subscriber is performed electronically utilizing a public communications network, such as the internet. Preferably the preferred embodiment internet enabled transaction processing device discussed above is also utilized for the authentication process. Thus, in step 14 the subscriber or one of the other authorized individuals as specified in the application provides identifying information to the payment processor. The identifying information provided by the subscriber is captured by the transaction processing device before being provided to the payment processor.

In the preferred embodiment, the identifying information provided by the subscriber to the payment processor is information originally provided to the subscriber by a third party, i.e. an entity other than the payment processor, such as a certifying authority. For example, such identifying information may be the subscriber's driver's license number, the subscriber's credit card number, the subscriber's debit card number, the subscriber's smart card number, and/or the like. Identifying information may also include other information, such as biometric data, for example, fingerprint information, thumb print information, retina information, CCD image of the face of the subscriber in addition to or in place of the above mentioned third party provided information. Moreover, the signature of the subscriber may also be used.

In alternative embodiments, the information provided to the transaction processing device may be electronic wallet information, such as a cryptographic information based data such as SET certificates used for authenticating electronic purchases or transaction, cryptographic token issued by a governmental authority, a token contained in a smart card and/or the like.

Moreover, it is desirable that the identifying information provided to the payment processor by the subscriber in step 14 is information that has not been previously provided to the payment processor directly by the subscriber. For example, if the identifying information provided by the subscriber during the authentication process is the subscriber's driver's license number, it is desirable that this information was not previously provided to the payment processor by the subscriber. However, it is conceivable that the payment processor may have independently gathered such identifying information about the subscriber. For example, during due diligence the payment processor may have gathered information about the subscriber's credit card number from the subscriber's credit history report.

The identifying information is preferably captured by the preferred embodiment transaction processing device, such as device 20 shown in FIG. 2. The information may be provided to the transaction processing device by scanning or swiping the subscriber's driver's license, credit card, smart card, debit card, electronic benefits card and/or the like through a card reader, such as a magnetic stripe reader, smart card reader or other devices capable of reading such information. Such a card reader is preferably part of the transaction processing device of the preferred embodiment. In an alternative embodiment, such a card reader could be associated with the preferred embodiment transaction processing device.

When the information provided is or includes biometric information the information may be captured by a finger print reader, a retina scanner or other device capable of accepting such information. The subscriber may also use an electronic pen, for example a stylus to provide an identifying signature on the display associated with the device 20. The signature may be electronically captured.

The advantage of providing the identifying information to the transaction processing device by directly scanning or swiping the card is that it provides added security indicating that the person swiping the card is in possession of the card and is most likely an authorized user of the card. Moreover, it is difficult to manufacture fake cards that include magnetic stripes or other encoded information. Thus, by scanning or swiping the card directly an added layer of security is provided to the authentication process. If desired, however, in alternative embodiments, information from such cards may be provided to the transaction processing device by using key pad 22. The fact that the information is entered using the key pad also indicates that the person entering the information is in possession of the information and is most likely an authorized user of the card.

In alternative embodiments, information provided by the payment processor to the subscriber, such as the above mentioned identifying token, may be provided to the transaction processing device in addition to or in place of the above mentioned third party provided identifying information, by entering the same using the key pad 22 or the display screen 21. In cases where the payment processor has provided the subscriber with a physical device with the identifying token encoded in at least a portion of the device, the identifying token may be captured by the transaction processing device by a magnetic stripe reader, smart card reader, or other device depending on the type of physical device provided by the payment processor to the subscriber.

FIG. 3 shows a schematic of a preferred embodiment network for activating the subscriber account. Transaction processing device 31 is connected to a remote server 32 via a communication network. The remote server is preferably a server maintained by the subscriber account provider, such as the payment processor. The remote server 32 is shown connected to a third party server 33, such as the server of a certifying authority, the server of a bank issuing a credit card, an ATM card, or a debit card, via communications network 35.

In step 14 (FIG. 1), the information captured by the transaction processing device 31 is provided to the subscriber account provider server 32, wherein the remote server is preferably under the control of the payment processor. In the preferred embodiment, the captured information is transmitted securely to the remote server through communication network 34, such as a public network, for example a network capable of TCP/IP communications, such as the internet. In an alternative embodiment, communication network 34 may be a private network, such as existing credit card processing networks currently being used at retail locations in conjunction with point of sale (POS) terminals, such as credit or debit card processing terminals.

In the preferred embodiment, the transaction processing terminal is equipped with identifying information unique to the particular transaction processing terminal, such as a private key and public key pair. At least part of the information captured by the transaction processing device is encrypted. The encryption may be performed by the cryptographic services associated with the transaction processing device 31. The cryptographic service may include asymmetric key cryptography, symmetric key cryptography, sequence generator cryptography, and/or the like. For example, the terminal could encrypt a portion of the captured data (or the entire captured data) using the private key of the device. If desired, the information could be further encrypted utilizing the public key of the payment processor. The encrypted information is preferably sent via communication network 34 to the provider server 32. Encryption of the data before transmission is especially useful when communication network 34 is a public network which is not inherently secure.

In the preferred embodiment, the payment processor is able to verify the terminal, the subscriber and also verify that the received information was intended for the payment processor. By decrypting the received data by utilizing the private key of the payment processor, the payment processor can verify that the data was intended for the payment processor. Additionally or in the alternative, by using the public key of the terminal of the subscriber, the payment processor is able to verify that the received data came from the particular transaction processing terminal. Thus, if the payment processor is unable to verify that the received data originated from a terminal that was initially provided to the subscriber either directly by the payment processor or indirectly through a representative of the payment processor or a retail location, then the payment processor would not enable the subscriber account for use.

In step 15, the payment processor verifies the identifying information received from the subscriber. In the preferred embodiment, the payment processor provides at least a portion of the received information to third party server 33, such as a server maintained by a certifying authority, for example, the government, via communication network 35. Thus, for example, if the identifying information initially captured by the transaction processing terminal and provided to the payment processor is a driver's license number of an authorized individual or a credit card number of the business entity or an authorized individual, that number could be sent to the certifying authority. Utilizing the identifying information, the certifying authority would provide verifying information associated with the identifying information to the payment processor. The verifying information could be for example, the name, address, social security number, and/or other like information associated with the driver's license number or credit card number. Upon receiving the verifying information from the third party server, the payment processor could either manually or electronically compare the verifying information (i.e. information received from the third party server) with information initially provided by the subscriber, such as in the above described step 11.

An additional layer of verification may be provided by requesting the subscriber to respond to challenge questions, such as mother's maiden name, zip code of the subscriber, or proprietary information about the business entity, if any, on behalf of which the individual is acting. The response to the challenge questions may be utilized to verify the subscriber. Thus, for example, if the identifying information initially captured by the transaction processing terminal and provided to the payment processor is a credit card number, the individual could be asked to provide his/her zip code or other information. The provided information could be captured by the transaction processing terminal and transmitted to the payment processor. The payment processor may then verify the response to the challenge question for example, from the card issuing bank.

In alternative embodiments, the response to the challenge questions captured by the transaction processing device may serve as the identifying information of step 15. Thus, for example, if the identifying information initially captured by the transaction processing terminal and provided to the payment processor is the individual's mother's maiden name that information could be sent to a third party for independent verification of the mother's maiden name. Alternatively, if the payment processor has already gathered that information either from the individual or independently of the individual, the payment processor may verify that the received identifying information corresponds with the identifying information already gathered by the payment processor.

The verifying step 15 of the preferred embodiment as described above is especially useful in situations where the identifying information provided to the payment processor by the subscriber comprises information which was already in the possession of the subscriber when the subscriber initially applied for the subscriber account. For example, the subscriber's driver's license number, the subscriber's credit card number and/or the like. Moreover, the verifying step 15 of the preferred embodiment as described above is also especially useful in situations where the identifying information provided to the payment processor by the subscriber comprises information which was initially provided to the subscriber by a third party other than the payment processor as it provides independent verification (i.e. verification by someone other than the payment processor) that the individual setting up the terminal is authorized to set up the terminal, such as an individual who owns the business or an authorized representative.

In situations where the identifying information provided to the payment processor by the subscriber during step 14 is an identifying token, such as a username and/or password, initially provided to the subscriber by the payment processor, the payment processor need not utilize a third party server to verify the subscriber. In such a case, the payment processor itself may verify that the received username and password corresponds with the username and password for the terminal and the particular subscriber.

Moreover, in situations where the payment processor has previously gathered information about the subscriber independently of the subscriber, the payment processor need not utilize a third party server to verify the subscriber. In such a case, the payment processor may verify that the received identifying information corresponds with the identifying information independently gathered by the payment processor. For example, upon receiving an application for a subscriber account, the payment processor may independently have gathered information about the subscriber's driver's license number and the address associated with it. The payment processor may store the gathered information in a database associated with the payment processor server. By comparing portions of the identifying information, such as driver's license number, provided by the subscriber with the driver's license number stored in the database associated with the payment processor server, the payment processor may verify that the received driver's license number corresponds with the driver's license number provided by the subscriber.

Furthermore, in certain situations in order to verify that an authorized individual is setting up the terminal, the payment processor may verify the identifying information both by utilizing a third party and independently verifying the received information. For example, the payment processor may verify that the received driver's license number corresponds with the information provided by the subscriber by contacting a third party.

Moreover, certain types of identifying information are self authenticating. For example, a smart card may include an encrypted packet that can be verified offline. In such a case, a well known certifying authority's public key can be used to verify that a certificate on the smart card was signed by the certifying authority's private key. Once the certificate is verified, the encrypted packet may be extracted and decrypted.

In the preferred embodiment, upon successful verification that the individual setting up the terminal is an authorized individual, in step 16 the payment processor activates the subscriber account for network services. In the preferred embodiment, no data is transmitted back to the transaction processing device to activate the subscriber account. Activation is performed simply by associating the subscriber account with the particular transaction processing terminal and enabling the subscriber account. Once the subscriber account is activated, any information, such as transaction information involving the sale of goods and/or services to a customer, received from the particular terminal will be associated with the particular subscriber account.

In an alternative embodiment, in order to activate the subscriber account, the payment processor transmits data back to the terminal, preferably via communication network 34. In the preferred embodiment, the data transmitted back to the terminal from the payment processor is encrypted such that only the intended terminal can read the data. Preferably, the data transmitted back is configuration information. Such configuration information may include, for example, the name, address, phone number of the business entity, if any, account information, name of person setting up the terminal, the date and time the account was activated, alternate phone numbers or access numbers for subsequent access to a public network, alternate phone numbers or access numbers for subsequent access to a private network, and/or other like information. The information sent back to the terminal may be stored in the terminal and used, for example to print receipts or other documents.

The configuration information may also be used to remotely configure the transaction processing device. For example, if the subscriber desires to change the information, such as address, slogan, and/or the like, appearing on receipts provided to customers, the subscriber may access the payment processor's web site and change the configuration information related to one or more of the transaction processing devices. The payment processor may then securely transmit the configuration information to the transaction processing device. Thus, the subscriber does not have to manually change the configuration information on the device itself. this process is described in detail in the above referenced U.S. patent application, entitled "A System and Method for Secure Provisioning and Configuration Of A Transactions Processing Device", the disclosure of which is hereby incorporated herein by reference.

FIG. 4 shows a flowchart 40 for activating the subscriber account in an alternative embodiment. The implementation of the individual steps of the alternative embodiment of FIG. 4 is substantially the same as the corresponding steps of the preferred embodiment as discussed in detail above with reference to FIG. 1. As such the individual steps of FIG. 4 will not be discussed in great detail.

However, in the implementation of FIG. 4, the order of the steps is different from that of FIG. 1. In the embodiment of FIG. 4, in step 41 the transaction processing device is provided to the subscriber. The transaction processing device may be purchased by the subscriber at a retail location or be shipped to the subscriber by the payment processor or a representative of the payment processor.

Upon receiving the transaction processing device, in step 42 the subscriber applies for a subscriber account with the payment processor. In addition to the methods discussed with regard to FIG. 1, the subscriber may apply for the subscriber account utilizing the transaction processing device obtained in step 41. Thus, by utilizing the display 21, the keypad 22, and/or the card reader 23, the subscriber may enter the desired information and securely transmit it to the payment processor over a communication network.

Upon receiving the application, in step 43 the payment processor performs due diligence on the received application. The identifying token, if any, may be provided to the subscriber upon completion of due diligence or it may be provided to the subscriber with the transaction processing device in step 41. Steps 44, 45, and 46 of FIG. 4 correspond to steps 14, 15 and 16 respectively of FIG. 1 and will not be discussed further.

An additional advantage of the alternative embodiment of FIG. 4 for activating a subscriber account is that a subscriber can purchase the transaction processing terminal at a retail location and then complete an application for a subscriber account, say at a web site of the payment processor. Moreover, a subscriber can acquire a used transaction processing terminal and then complete an application for a subscriber account thereby resulting in cost savings to the subscriber.

FIG. 5 shows a flowchart 50 for activating the subscriber account in another alternative embodiment. The implementation of the individual steps of the alternative embodiment of FIG. 5 is substantially the same as the corresponding steps of the preferred embodiment as discussed in detail above with reference to FIG. 1 and the alternative embodiment as discussed above with reference to FIG. 4. As such the individual steps of FIG. 5 will not be discussed in great detail. Steps 51, 52, 53, 54, and 55 of FIG. 5 correspond to steps 41, 42, 44, 45, and 46 of FIG. 4 and will not be discussed further.

The order of the steps in the implementation of FIG. 5 is the same as the order of the steps in the implementation of FIG. 4. However, in the implementation of FIG. 5, the step of performing due diligence (step 43 of FIG. 4) is not included. An advantage of the alternative embodiment of FIG. 5 is that a subscriber with an existing account can add terminals at the same or different location as an existing terminal.

An advantage of the preferred embodiment system and method is that the transaction processing device could be shipped without associating them to specific customers even if that information is already available thereby eliminating the burden of closely tracking and accounting for every terminal during all stages of the manufacturing and distribution process. In the preferred embodiment, the transaction processing device will be rendered unusable until the association to a merchant account is done during installation.

The preferred embodiment system and method allows distribution of the terminals via traditional retail channels to allow customers to receive or purchase the terminals even if they have not yet acquired a merchant account. The terminals can then be securely associated with a merchant account.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for activating a subscriber account for providing a network service, comprising the steps of:
   receiving initial information from a subscriber;
   storing said received information;
   providing a transaction processing device to said subscriber;
   receiving captured information from said subscriber through said transaction processing device;
   utilizing said captured information to receive verifying information about said subscriber; and
   comparing said verifying information with said initial information to authenticate said subscriber.

2. The method of claim 1, wherein said captured information is information provided to said subscriber by a third party certifying authority.

3. The method of claim 1, wherein said initial information is received by a provider of said subscriber account.

4. The method of claim 3, wherein said captured information is information that has not been previously provided to said provider of said subscriber account by said subscriber.

5. The method of claim 3, wherein said receiving captured information step includes the step of:
   receiving by said transaction processing device identifying information from said subscriber, wherein said identifying information is captured by said transaction processing device.

6. The method of claim 5, wherein said receiving captured information step further includes the step of:
   receiving securely from said transaction processing device said captured information by a remote server associated with said provider of said subscriber account.

7. The method of claim 6, wherein at least a portion of said captured information is encrypted prior to being transmitted to said remote server over a communication network.

8. The method of claim 7, wherein said encryption is performed utilizing a private key unique to said transaction processing device.

9. The method of claim 8, wherein said captured information is further encrypted utilizing a public key of said subscriber account provider.

10. The method of claim 7, wherein said encryption is performed utilizing a public key of said subscriber account provider.

11. The method of claim 8, wherein said communications network is a public network.

12. The method of claim 11, wherein said public network is capable of TCP/IP communication.

13. The method of claim 8, wherein said utilizing said captured information step comprises the steps of:
   decrypting said received captured information by said subscriber account provider utilizing a public key of said transaction processing device in order to verify the source of said received captured information.

14. The method of claim 13, wherein said received captured information is further decrypted utilizing the private key of a payment processor.

15. The method of claim 13, further comprising the step of:
   providing at least a portion of said decrypted information to a third party server; and
   receiving said verifying information from said third party server in response to providing said decrypted information to said third party server.

16. The method of claim 13, further comprising the step of:
   retrieving, by said subscriber account provider, verifying information from said remote server, wherein said verifying information had been previously retrieved by said subscriber account provider from a third party server.

17. The method of claim 5, wherein said identifying information is received by said transaction processing device by scanning a card across a card reader associated with said transaction processing device.

18. The method of claim 17, wherein said card reader is part of said transaction processing device.

19. The method of claim 1, wherein said captured information is a driver's license number.

20. The method of claim 1, wherein said captured information is provided to said subscriber by a provider of said transaction processing device.

21. The method of claim 2, wherein said certifying authority provides independent verification of said subscriber based in part on said initial information.

22. The method of claim 1, further comprising the step of:
   activating said transaction processing device for performing said network service upon successful verification of said subscriber.

23. The method of claim 1, further comprising the step of:
   activating said subscriber account for providing said network service upon successful verification of said subscriber.

24. The method of claim 1, further comprising the step of:
   activating said subscriber account for providing said network service upon successful verification of said subscriber and said transaction processing device.

25. The method of claim 23, wherein said activating step comprises the step of:
   associating said subscriber account with said transaction processing device; and
   enabling said subscriber account.

26. The method of claim 25, further comprising the step of:
   transmitting data back to said transaction processing device.

27. The method of claim 26, wherein said transmitted data is configuration data.

28. The method of claim 1, wherein said network service is a payment processing service.

29. The method of claim 1, wherein said payment processing service includes credit card processing.

30. The method of claim 28, wherein said payment processing service is selected from the group consisting of debit card processing, check verification, check guarantee, payroll processing, gift certificate issuance, issuance of electronic tickets, and issuance of money order.

31. The method of claim 1, wherein said initial information is provided to a payment processor by said subscriber by entering information at a web site maintained by said payment processor.

32. The method of claim 31, wherein said information is entered by said subscriber via a wireless device.

33. The method of claim 1, wherein said transaction processing device is a standalone internet enabled transaction processing device.

34. The method of claim 1, wherein said transaction processing device is a standalone internet enabled wireless transaction processing device.

35. The method of claim 1, further comprising the step of:
providing by a provider of said subscriber account an identifying token to said subscriber separate from said transaction processing device.

36. The method of claim 35, wherein said identifying token is a username and a password.

37. The method of claim 35, wherein said identifying token is provided to said subscriber electronically in response to receiving said initial information from said subscriber.

38. The method of claim 35, wherein said identifying token is selected by said subscriber.

39. The method of claim 35, wherein said identifying token is selected by a provider of said subscriber account.

40. The method of claim 35, wherein said identifying token is encoded in a physical device provided to said subscriber by a provider of said subscriber account.

41. The method of claim 35, wherein said received captured information includes said identifying token that had been previously provided to said subscriber by said subscriber account provider.

42. A method for electronic authentication of a subscriber requesting a subscriber account for providing a payment processing service, comprising the steps of:
receiving initial information from said subscriber, wherein said initial information is received by a payment processor;
storing said received information in a database associated with said payment processor;
providing a point of sale terminal to said subscriber;
receiving by said point of sale terminal identifying information from said subscriber, wherein said identifying information is captured by said transaction processing device, wherein at least a portion of said captured information is encrypted by said point of sale terminal;
receiving said encrypted information from said point of sale terminal via a public network;
decrypting said received encrypted information by said payment processor;
providing at least a portion of said decrypted information to a third party server;
receiving verifying information from said third party server wherein said verifying information is related to said decrypted information provided to said third party server;
comparing said verifying information with said initial information by said payment processor to authenticate said subscriber; and
activating said subscriber account for performing said payment processing service upon authentication of said subscriber.

43. The method of claim 42, wherein said point of sale terminal utilizes a private key unique to said point of sale terminal for said encryption of said captured information.

44. The method of claim 43, wherein said payment processor utilizes a public key of said point of sale terminal for said decryption of said received encrypted information.

45. A method of activating a subscriber account for providing a network service via a transaction processing device, comprising:
receiving initial information from a subscriber;
storing said initial information;
providing said transaction processing device to said subscriber;
receiving identification information from said subscriber through said transaction processing device;
communicating, by said transaction processing device through a network, said identification information to an authenticating server;
using, by said authenticating server, said identification information to obtain verifying information related to said subscriber; and
activating, by said authenticating server, said subscriber account when said verifying information is consistent with said initial information, wherein said activating enables said transaction processing device to initiate payments into said subscriber account from third parties via said network.

46. The method of claim 45 further comprising:
retrieving said verifying information through a third party server.

47. The method of claim 46 wherein said identification information is driver's license information and said retrieving communicates said driver's license information to said third party server to obtain said verifying information.

48. The method of claim 46 further comprising:
communicating at least one challenge question from said authenticating server to said subscriber through said transaction processing device as a condition to said activating.

49. The method of claim 45 further comprising:
verifying an identifier of said transaction processing device by said authenticating server as a condition to said activating.

50. The method of claim 45 wherein said activating comprises:
communicating configuration information to said transaction processing device.

* * * * *